(12) United States Patent
Smith et al.

(10) Patent No.: US 10,449,503 B2
(45) Date of Patent: Oct. 22, 2019

(54) TEMPORARY ADDITION OR INJECTION SYSTEM

(71) Applicant: BASF Corporation, Florham Park, NJ (US)

(72) Inventors: Jason K. Smith, Cranford, NJ (US); Emanuele Fratto, Gorgonzola (IT); Fabio Novelli, Gorgonzola (IT); Stefano C. Riva, Cuggiono (IT); Erik Wayne Johnson, Lino Lakes, MN (US)

( * ) Notice: Subject to any disclaimer, the term of this patent is extended or adjusted under 35 U.S.C. 154(b) by 196 days.

(21) Appl. No.: 15/122,886

(22) PCT Filed: Feb. 28, 2015

(86) PCT No.: PCT/US2015/018205
§ 371 (c)(1),
(2) Date: Aug. 31, 2016

(87) PCT Pub. No.: WO2015/134338
PCT Pub. Date: Sep. 11, 2015

(65) Prior Publication Data
US 2017/0065954 A1    Mar. 9, 2017

Related U.S. Application Data

(60) Provisional application No. 61/948,008, filed on Mar. 4, 2014.

(51) Int. Cl.
*B01J 8/00*   (2006.01)
*C10G 11/18*   (2006.01)
(Continued)

(52) U.S. Cl.
CPC ............... *B01J 8/003* (2013.01); *B01J 8/004* (2013.01); *B01J 8/0035* (2013.01); *B60P 3/00* (2013.01);
(Continued)

(58) Field of Classification Search
CPC . B01J 8/003; B01J 8/004; B01J 8/0035; B01J 2208/00752; B01J 2208/00654; B60P 3/00; B65D 88/30; C10G 11/18
See application file for complete search history.

(56) References Cited

U.S. PATENT DOCUMENTS 2,429,161 A    10/1947 Hudson
3,175,968 A    3/1965 Berger
(Continued)

FOREIGN PATENT DOCUMENTS

EP    0 563 913 B1    5/1996
EP    1 142 755 B1    11/2005
(Continued)

OTHER PUBLICATIONS

First Office Action in CN Application No. 201580011803.X, dated Jul. 17, 2017 (English translation included—12 pages).
(Continued)

*Primary Examiner* — Randy Boyer
*Assistant Examiner* — Juan C Valencia
(74) *Attorney, Agent, or Firm* — Foley & Lardner LLP

(57) ABSTRACT

A temporary addition or injection system installed without the need for civil work comprising: one or more silos mounted on a trailer; optionally one or more transfer pots; and one or more control systems, wherein the one or more transfer pots and the one or more control systems are either (a) directly or indirectly connected to the one or more silos mounted on the trailer or (b) mounted adjacent to the one or more silos mounted on the trailer.

11 Claims, 5 Drawing Sheets

(51) Int. Cl.
*B65D 88/30* (2006.01)
*B60P 3/00* (2006.01)

(52) U.S. Cl.
CPC .............. *B65D 88/30* (2013.01); *C10G 11/18* (2013.01); *B01J 2208/00654* (2013.01); *B01J 2208/00752* (2013.01)

(56) References Cited

U.S. PATENT DOCUMENTS

| | | | |
|---|---|---|---|
| 3,644,199 A | | 2/1972 | Evans et al. |
| 3,849,291 A | | 11/1974 | Owen |
| 3,964,876 A | | 6/1976 | James |
| 3,974,062 A | | 8/1976 | Owen et al. |
| 4,026,789 A | | 5/1977 | James |
| 4,225,562 A | | 9/1980 | Anderson |
| 4,348,273 A | | 9/1982 | Nielsen |
| 4,775,275 A | | 10/1988 | Perry |
| 4,853,105 A | | 8/1989 | Herbst et al. |
| 4,877,514 A | | 10/1989 | Hettinger et al. |
| 4,985,136 A | | 1/1991 | Bartholic |
| 5,047,140 A | | 9/1991 | Owen et al. |
| 5,389,236 A | * | 2/1995 | Bartholic ............... C10G 11/18 208/120.01 |
| 5,464,591 A | | 11/1995 | Bartholic |
| 5,609,836 A | | 3/1997 | McManus et al. |
| 5,866,751 A | | 2/1999 | Womack et al. |
| 6,508,930 B1 | | 1/2003 | Evans et al. |
| 6,974,559 B2 | * | 12/2005 | Evans ................... B01J 8/0015 422/105 |
| 7,214,028 B2 | | 5/2007 | Boasso et al. |
| 7,390,396 B2 | | 6/2008 | Evans et al. |
| 7,658,889 B2 | | 2/2010 | Roux et al. |
| 8,012,422 B2 | | 9/2011 | Yaluris et al. |
| 8,142,134 B2 | | 3/2012 | Lavoie et al. |
| 2002/0141851 A1 | | 10/2002 | Weiss |
| 2003/0196932 A1 | | 10/2003 | Lomas |
| 2003/0202869 A1 | * | 10/2003 | Posch ................... B60P 1/6418 414/498 |
| 2004/0099572 A1 | | 5/2004 | Evans |
| 2004/0117158 A1 | | 6/2004 | Evans |
| 2004/0166032 A1 | | 8/2004 | Evans |
| 2005/0103684 A1 | | 5/2005 | Evans |
| 2005/0106079 A1 | | 5/2005 | Evans |
| 2005/0106080 A1 | | 5/2005 | Evans et al. |
| 2005/0214177 A1 | | 9/2005 | Albin |
| 2005/0216209 A1 | | 9/2005 | Evans |
| 2005/0260062 A1 | | 11/2005 | Boasso et al. |
| 2006/0000748 A1 | | 1/2006 | Evans |
| 2006/0074571 A1 | | 4/2006 | Evans |
| 2006/0138028 A1 | | 6/2006 | Evans |
| 2006/0140824 A1 | | 6/2006 | Evans |
| 2006/0147358 A1 | * | 7/2006 | Evans ................... B01J 8/0015 422/232 |
| 2007/0207017 A1 | | 9/2007 | Boasso et al. |
| 2007/0251862 A1 | | 11/2007 | Evans et al. |
| 2007/0267090 A1 | | 11/2007 | Jordan et al. |
| 2011/0056979 A1 | | 3/2011 | Albin |
| 2011/0280769 A1 | | 11/2011 | Yaluris et al. |
| 2011/0284588 A1 | | 11/2011 | Yaluris et al. |
| 2012/0024738 A1 | | 2/2012 | Herman et al. |
| 2013/0108402 A1 | | 5/2013 | Herman et al. |
| 2014/0041322 A1 | | 2/2014 | Pham et al. |

FOREIGN PATENT DOCUMENTS

| | | | |
|---|---|---|---|
| EP | 2 396 194 B1 | | 10/2013 |
| WO | WO-99/15483 | | 4/1999 |
| WO | WO-01/51589 | | 7/2001 |
| WO | WO-2004/076055 A2 | | 9/2004 |
| WO | WO-2013/062968 A2 | | 5/2013 |
| WO | WO-2014/028319 | | 2/2014 |
| WO | WO-2014/028321 | | 2/2014 |
| WO | WO2014028321 | * | 2/2014 |
| WO | WO2014028321 A1 | * | 2/2014 |

OTHER PUBLICATIONS

International Preliminary Report on Patentability in International Application No. PCT/US2015/018205, dated Sep. 15, 2016. (10 pages).
Written Opinion dated Jul. 3, 2017 in SG Application No. 11201607313R (6 pages).
Extended EP Search Report in EP Application No. 15758147.1, dated Aug. 1, 2017 (7 pages).

* cited by examiner

TEMPORARY ADDITION OR INJECTION SYSTEM

CROSS-REFERENCE TO RELATED APPLICATIONS

The present application is the U.S. National Stage of PCT/US2015/018205 filed on Feb. 28, 2015, which claims priority to U.S. Provisional Patent Application No. 61/948,008 filed Mar. 4, 2014, the entire contents of which are incorporated herein by reference in their entireties.

FIELD OF THE INVENTION

This invention relates to an addition or injection system with integrated material storage. In this invention, the addition or injection system is temporary and can be used to add any material (e.g., fluid catalytic cracking (FCC) catalyst, co-catalyst, or additives to an FCC unit) to any chemical/biochemical system or process. This system is designed to provide a temporary system which reduces the costs and time involved in setting up and/or using a standard permanent or semi-permanent addition or injection system.

BACKGROUND OF THE INVENTION

Addition or injection systems (sometimes referred to as loaders) are typically permanent or semi-permanent installations and are designed to add FCC catalyst(s) and additive(s). Permanent installations typically remain installed for several years while semi-permanent installations remain installed for several months to conduct product trials. In both cases, the loaders require appropriate foundation and civil work to ensure the stability of the loaders over an extended period of time (i.e., a few months to several years).

Permanent and semi-permanent loaders typically consist of a silo and a transfer vessel by which the catalyst is weighed and injected into the regenerator of an FCC unit. As these units are permanent or semi-permanent installations, they require significant effort and costs to install and uninstall. These permanent and semi-permanent loaders typically require the use of cranes and often require considerable civil work such as pouring foundations. In addition these loaders also require erection as well as packing and un-packing. As a result, significant costs and time are expended on these loaders.

As used herein, "civil work" is defined as requiring a significant amount of time (i.e., at least a day but typically at least a week) to complete construction work by pouring foundation(s), building/setting-up supports or reinforcements, obtaining approvals/permits for construction, etc. to permanently or semi-permanently install traditional permanent or semi-permanent addition or injection systems at a work-site.

For example, U.S. Pat. No. 7,470,406 discusses an apparatus for loading catalyst to a fluid catalyst cracking unit, comprising: a pressure vessel having a single output adapted for coupling to a fluid catalyst cracking unit; a plurality of separate catalyst storage containers coupled to the vessel, the containers maintained at a low pressure; and a pressure control system configured to selectively pressurize the vessel to a high pressure.

U.S. Pat. No. 7,842,250 provides an apparatus for loading catalyst to a fluid catalyst cracking unit, comprising: a transportable housing; a vessel disposed in the housing and configured to be coupled to the fluid catalyst cracking unit; a plurality of catalyst storage regions associated with the vessel; and a metering device interfaced with the vessel and configured to provide a metric indicative of an amount of catalyst provided from a selected one of the catalyst storage regions.

There is still a need to provide alternative loaders that are not permanent or semi-permanent in design. The invention described herein provides temporary addition or injection systems that can be installed quickly, inexpensively, and without the need for a crane or any civil work. Additionally, by removing the need for traditional permanent or semi-permanent installation(s), the temporary loader of the present invention can provide improved flexibility and capability in various chemical and biochemical processes.

SUMMARY OF THE INVENTION

According to one embodiment, a temporary addition or injection system installed without the need for civil work comprising: one or more silos mounted on a trailer; optionally one or more transfer pots; and one or more control systems, wherein the one or more transfer pots and the one or more control systems are either (a) directly or indirectly connected to the one or more silos mounted on the trailer or (b) mounted adjacent to the one or more silos mounted on the trailer, is provided.

According to another embodiment, a method of installing a temporary addition or injection system at a work-site, the method comprising the steps of: (i) mounting one or more silos on a trailer; (ii) mounting one or more transfer pots and one or more control systems on the trailer; (iii) transporting the one or more silos, the one or more transfer pots, and the one or more control systems on the trailer to the work-site; and (iv)(a) self-erecting the one or more silos to stand vertically on the trailer at the work-site or (iv)(b) dismounting the one or more silos at the work-site, is provided.

According to yet another embodiment, a method of injecting material from a temporary addition or injection system into a unit or system at a work-site, the method comprising the steps of: (i) transporting one or more silos, one or more transfer pots, and one or more control systems mounted on a trailer to the work-site; (ii)(a) self-erecting the one or more silos to stand vertically on the trailer at the work-site or (ii)(b) dismounting the one or more silos at the work-site; (iii) connecting the one or more silos to the unit or system at the work-site via the one or more transfer pots; and (iv) injecting the material from the one or more transfer pots into the unit or system at the work-site, is provided.

DETAILED DESCRIPTION OF THE INVENTION

Figure 1:
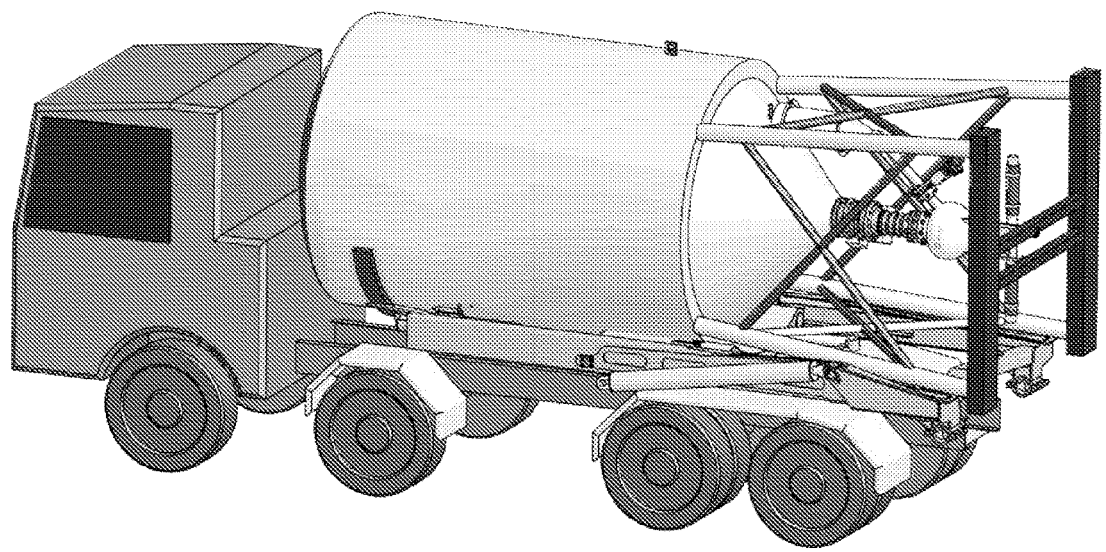
FIG. 1 shows a transport configuration of a temporary addition or injection system.

The "temporary" addition or injection system described herein refers to an addition or injection system that is completely portable and does not require any civil work. The use of the term "temporary" to qualify the addition or injection system described in this invention is to clearly distinguish over the permanent or semi-permanent systems known in the art.

The temporary addition or injection system of the present invention increases process flexibility and capability at lower costs and increased speed. The addition or injection system is trailer mounted to provide maximum flexibility.

It will be understood that the addition or injection system described in this disclosure includes:
one or more silos mounted on a trailer;
optionally one or more transfer pots; and
one or more control systems.

The "transfer pot" as used herein refers to a container or vessel that is directly or indirectly connected to one or more silos such that material(s) stored in the silo(s) are transferred into the transfer pot first where the material(s) can be mixed and/or measured and then the material(s) are transferred out using a connection (e.g., a pipe) to the work-site process or unit.

The "trailer" as used herein refers to a typical trailer that may or may not be a part of a truck or other similar transportation system.

A silo(s) typically between 30 ft$^3$ and 2000 ft$^3$, more preferably between 50 ft$^3$ and 1000 ft$^3$, and most preferably between 100 ft$^3$ and 500 ft$^3$ is mounted to the trailer in a horizontal position.

The silo(s), which is essentially a storage unit or vessel for the solid material, typically stores the material(s) at low pressures (e.g., 100 to 1000 psi).

The material(s) from the silo(s) are gravity fed, vacuum fed, or pneumatically fed into the transfer pot which is smaller than the silo(s). The transfer pot can have a volumetric size capacity of 0.5 ft$^3$ to 500 ft$^3$, preferably 1 ft$^3$ to 200 ft$^3$, more preferably 5 ft$^3$ to 50 ft$^3$, and most preferably, 10 ft$^3$ to 30 ft$^3$.

According to one embodiment, a temporary addition or injection system installed without the need for civil work is described. This temporary addition or injection system comprises: one or more silos mounted on a trailer; optionally one or more transfer pots; and one or more control systems, wherein the one or more transfer pots and the one or more control systems are either (a) directly or indirectly connected to the one or more silos mounted on the trailer or (b) mounted adjacent to the one or more silos mounted on the trailer.

As used herein, "civil work" is defined as requiring a significant amount of time (i.e., at least a day but typically at least a week) to complete construction work by pouring foundation(s), building/setting-up supports or reinforcements, obtaining approvals/permits for construction, etc. to permanently or semi-permanently install traditional permanent or semi-permanent addition or injection systems.

The one or more silos are mounted on the trailer in a horizontal position or in a vertical position. In preferred embodiments, the one or more silos are mounted on the trailer in a horizontal position.

According to another embodiment, a method of installing a temporary addition or injection system at a work-site is described. This method comprises the steps of: (i) mounting one or more silos on a trailer; (ii) mounting one or more transfer pots and one or more control systems on the trailer; (iii) transporting the one or more silos, the one or more transfer pots, and the one or more control systems on the trailer to the work-site; and (iv)(a) self-erecting the one or more silos to stand vertically on the trailer at the work-site or (iv)(b) dismounting the one or more silos at the work-site.

In step (ii) of this process, the one or more transfer pots and the one or more control systems can either be (a) directly or indirectly connected to the one or more silos mounted on the trailer or (b) mounted adjacent to the one or more silos mounted on the trailer.

Step (iv)(a) can further comprise standing the self-erected one or more silos vertically and directly above the one or more transfer pots and the one or more control systems.

The above-described method can include a further step (v) which involves connecting the one or more silos to a unit or system at the work-site via the one or more transfer pots.

The one or more silos can be (A) pre-filled with material before step (i) or (B) filled with material after step (i) of the above-described process.

The above-described method can include a further step (vi) which involves injecting the material from the one or more transfer pots into a unit or system at the work-site.

Step (vi) can further comprise utilizing compressed gas for injecting the material into the unit or system at the work-site. The compressed gas can be air, nitrogen, helium, neon, argon, krypton, xenon, radon, and mixtures thereof.

The above-described method can include a further step (vii) which involves utilizing load cells for measuring the amount of material entering and leaving the one or more transfer pots which are positioned on the load cells.

As used herein, "load cells" are defined as being directly or indirectly connected to the transfer pot and/or silo and allowing for accurate loading and weighing of the material(s) being transferred out of the transfer pot to a work-site process/unit.

The unit or system at the work-site can be any chemical or biochemical process or unit. In preferred embodiments, the unit or system at the work-site can be a fluid catalytic cracking unit.

According to another embodiment, a method of injecting material from a temporary addition or injection system into a unit or system at a work-site is described. This method comprises the steps of: (i) transporting one or more silos, one or more transfer pots, and one or more control systems mounted on a trailer to the work-site; (ii)(a) self-erecting the one or more silos to stand vertically on the trailer at the work-site or (ii)(b) dismounting the one or more silos at the work-site; (iii) connecting the one or more silos to the unit or system at the work-site via the one or more transfer pots; and (iv) injecting the material from the one or more transfer pots into the unit or system at the work-site.

This above-described method can further comprise step (v) which involves utilizing load cells for measuring the amount of material entering and leaving the one or more transfer pots which are positioned on the load cells.

The one or more silos in the above-described method can be (A) pre-filled with material before step (i) or (B) filled with material after step (i).

FIG. 1 shows a transport configuration of a temporary addition or injection system. As shown in FIG. 1, the temporary addition or injection system described above is transported from a first location to a work-site on a truck/trailer or similar transportation device. This allows for addition of material(s) (e.g., catalyst(s), co-catalyst(s), additive(s), etc.) at a work-site without the need for any civil work.

Figure 2:
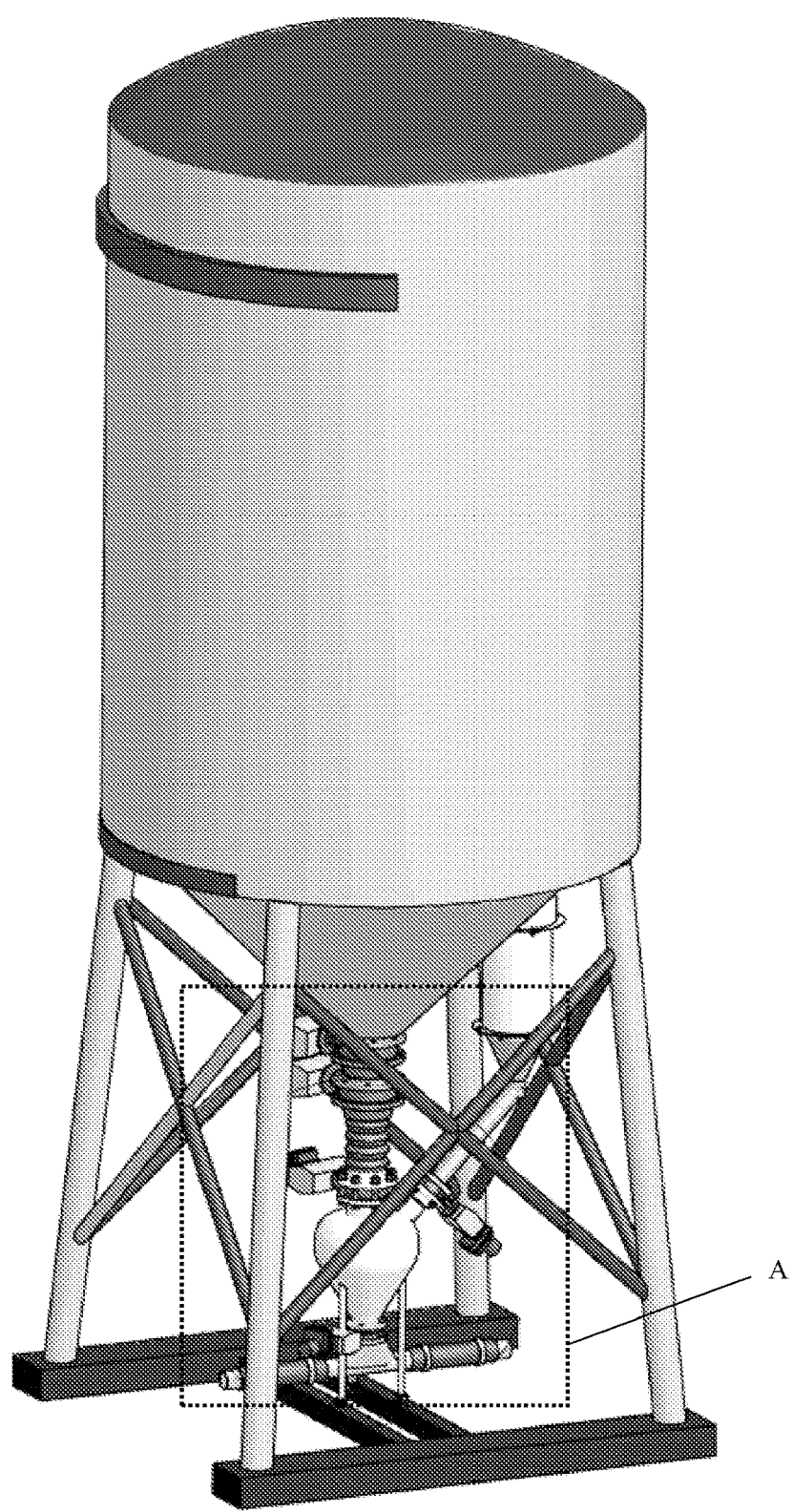
FIG. 2 shows an operation configuration of the temporary addition or injection system.
Figure 3:
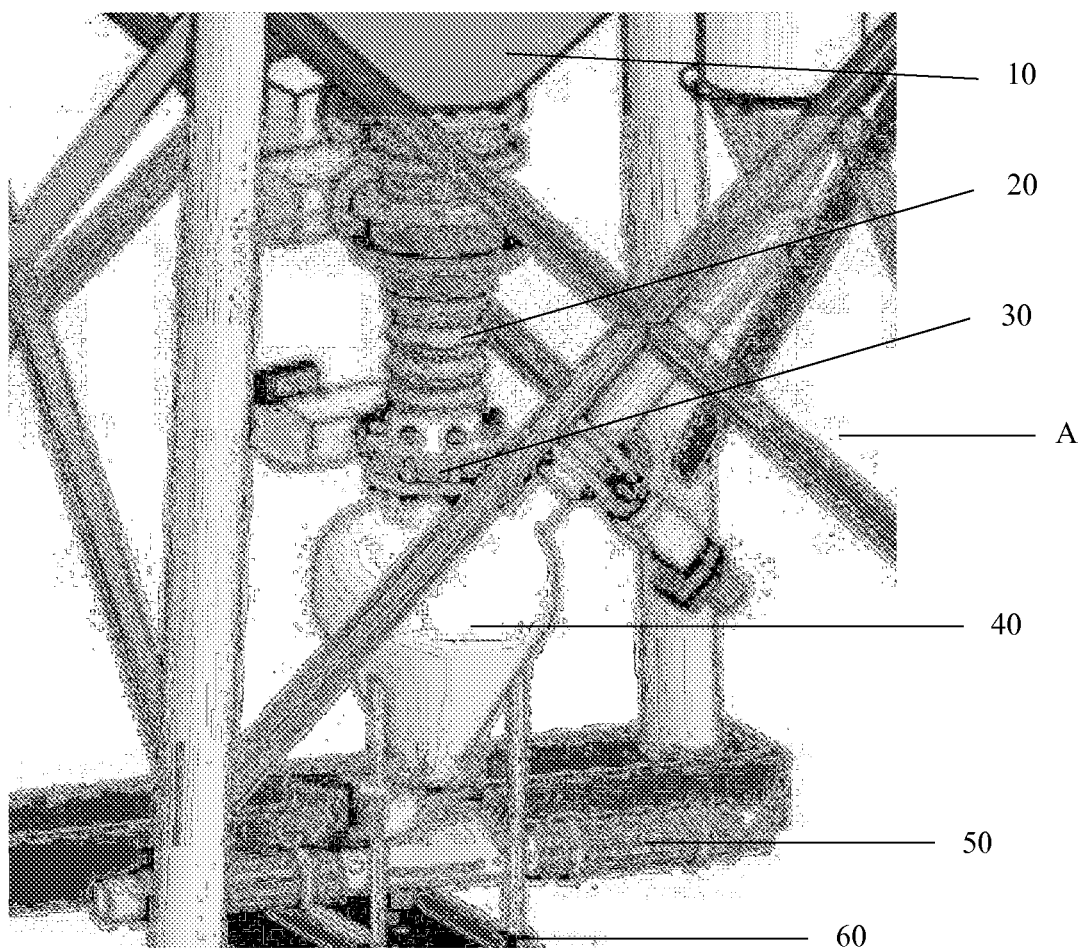
FIG. 3 shows an exploded view of "A" from FIG. 2.

FIG. 2 shows an operation configuration of the temporary addition or injection system. FIG. 3 shows an exploded view of "A" from FIG. 2. In FIG. 3, 10 is the silo which is connected to 40 the transfer pot via a flexible pipe 20 and a valve 30. The material(s) stored in the silo 10 is mixed/measured in the transfer pot 40 and transferred out of the temporary addition or injection system to the work-site process/unit via a transfer pipe 50. The load cells 60, as defined above, allow for accurate loading and weighing of the material(s) being transferred out of the transfer pot to the work-site process/unit.

Figure 4:
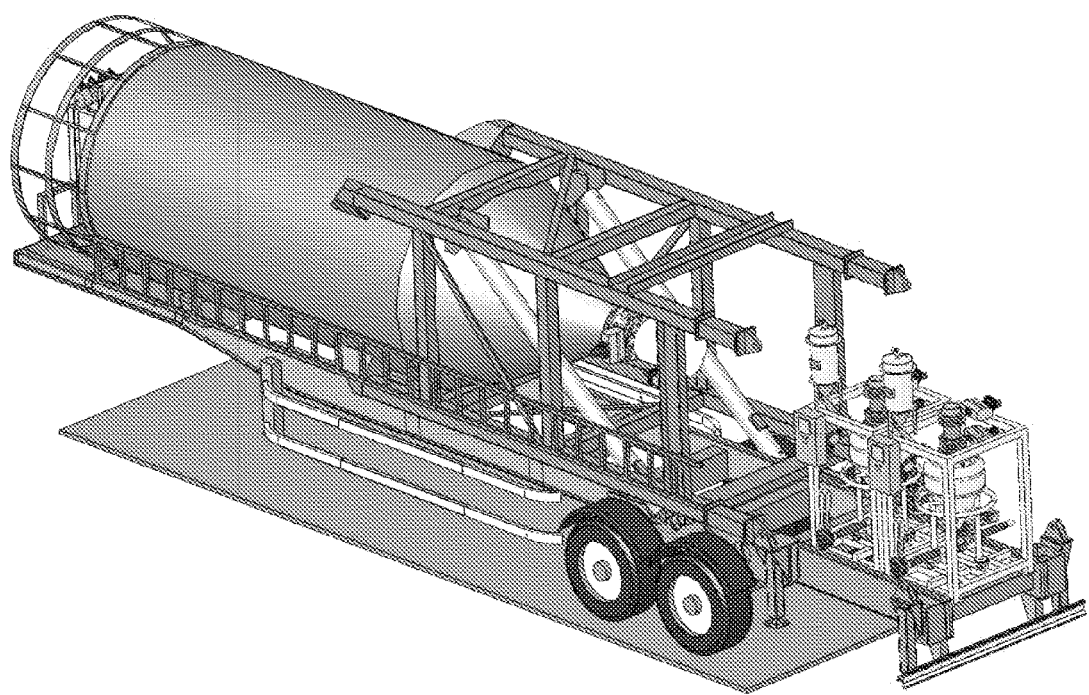
FIG. 4 shows a transport configuration of a self-erecting silo.
Figure 5:
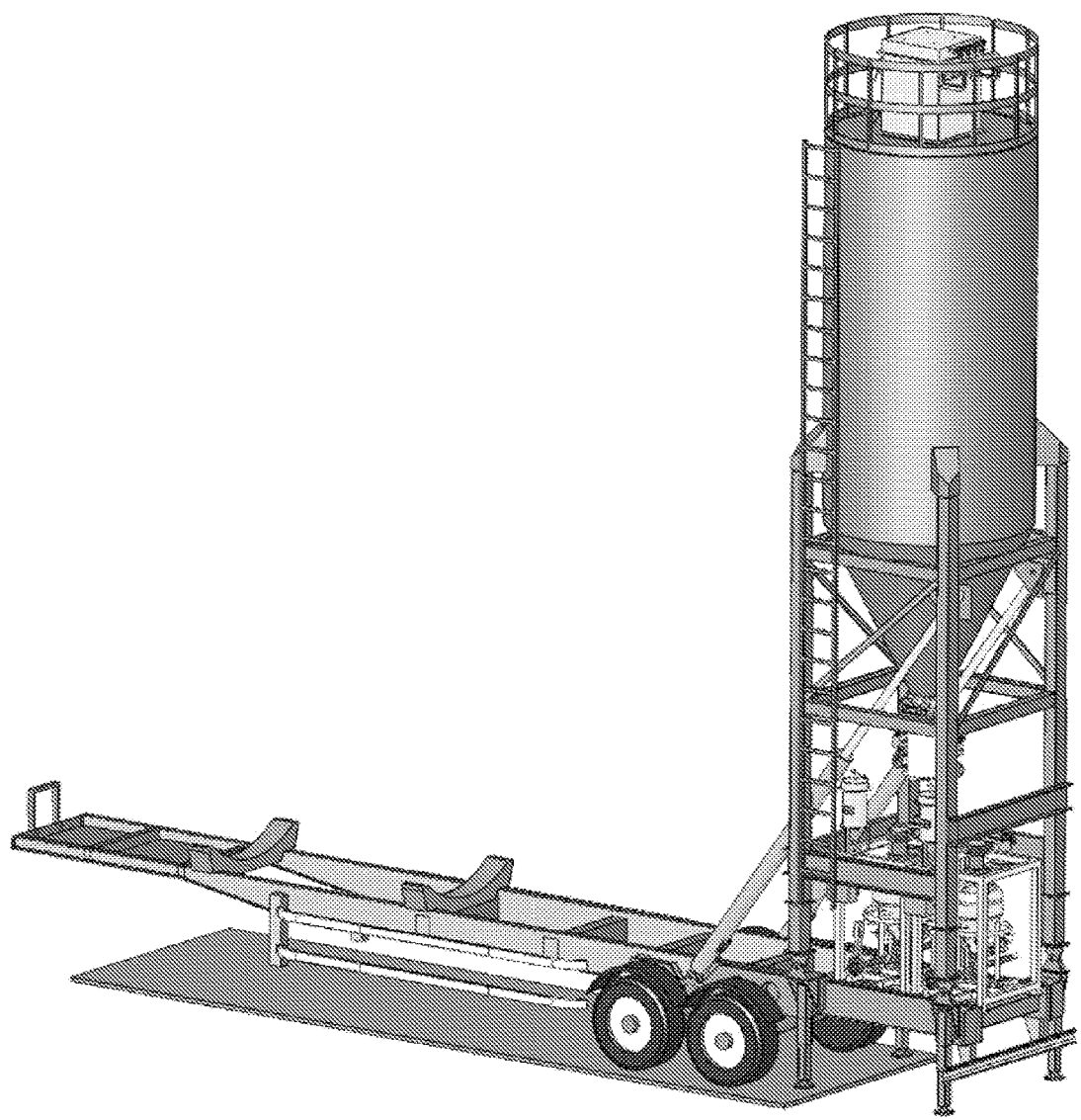
FIG. 5 shows an operation configuration of the self-erecting silo.

FIG. 4 shows a transport configuration of a self-erecting silo. FIG. 5 shows an operation configuration of the self-erecting silo.

The transfer pot and control system, also trailer mounted, are located adjacent to the horizontal loader. Upon arrival of a transport (e.g., a truck) carrying the addition or injection system to a work-site, the silo is self-erected such that the silo stands vertically and directly above the transfer pot. The transfer pot sits upon load cells to measure the weight of material entering and leaving the transfer pot. The silo may be transported to the work site with some volume of FCC catalyst, co-catalyst, or additive or upon being erected, the silo is filled with the FCC catalyst, co-catalyst, or additive that is to be injected into the FCC unit.

The addition or injection system can be connected to a power source, pressurized air or nitrogen, and/or control system upon being erected in order to effect transfer of material stored in the silo to the work-site process/system.

Alternatively, pressurized air or nitrogen can be generated on the addition or injection system trailer or on a separate trailer.

A material line from the transfer pot to the work-site process/unit (e.g., a FCC regenerator) can be connected to transfer the material stored in the silo. Alternatively, a tie in to an existing transfer line can be established to transfer the material from the silo to the work-site process/unit. This line can be long enough to allow to locate the truck or trailer carrying the addition or injection system anywhere it is appropriate based on the specific arrangement of the work-site process/unit(s).

In some embodiments, catalyst(s) (e.g., FCC catalyst), co-catalyst(s), or additive(s) may be pulled into the transfer pot from the silo via tote bins, flow bins, drums, supersacks, silos, or other storage vessels.

In some embodiments, an air or nitrogen ring is installed on the transfer pot or the silo. This enables pre-blending and homogenizing of FCC catalyst, co-catalyst, or additives from any combination of sources including the self-erected silo.

In some embodiments, the addition or injection system can be disconnected from the truck or trailer and function on its own.

The silo can be filled after erected and then as needed. Optionally, smaller silos may be pre-filled with material prior to erection.

The control system(s) of the addition or injection system(s) described in this disclosure can receive or transfer data for purposes of switching between transport mode and operation mode of the addition or injection systems, dispensing pre-measured amounts of material(s), mixing to varying degrees or not mixing the material(s) in the transfer pot, data collection, process parameter information, etc.

The control system(s) of the addition or injection system(s) can receive or transfer data via mobile devices or via a keypad or similar hardware. The data sent or received form the control system(s) is very advantageous in not only controlling amount(s) of material(s) dispensed, level of mixing of the material(s) if any, tracking amount(s) of material(s) used for purposes of re-filling and determination of costs/pricing.

Transmission Control Protocol/Internet Protocol (TCP\IP) transfer data can be used as well for controlling the control system(s) remotely thereby controlling the entire addition or injection system from a remote location.

One of the significant advantages of the temporary addition or injection system of this invention is that the system can be quickly and inexpensively connected at work-site to a chemical/biochemical process/unit.

Additionally, the present temporary addition or injection system significantly reduces the time required and increases flexibility to connect to, operate, and disconnect from a work-site chemical/biochemical process/unit. As there is no civil work necessary, flexibility is maximized and costs are reduced in adding materials to work-site chemical/biochemical processes/units.

The temporary addition or injection system described herein is particularly advantageous to use in trial processes/units and seasonal or temporary processes/units.

EXAMPLES

Example 1: Self-Erecting Portable Addition or Injection System for Injecting Catalyst Additives The addition or injection system is designed for the injection rate of 20 MT/day maximum of catalyst additives from the self-erecting portable loader. The addition or injection system is designed to allow the system to be placed into service with minimal mechanical interfacing. This solution offers an alternative designed that permit to obtain a versatile mobile system with the following benefits:

the system can be placed in the operative condition with minimal mechanical interfacing;
the use of a portable system permits to move the system to the work-site according to necessity of the particular process or customer;
the transporter uses a dense pressure system that allows to reduce the air consumption but also allows conveying according to the process specifications;
the additive can be easily loaded to both in manual and auto mode according to the process or customer specifications;
controlled flow of material(s) from the addition or injection system offers a higher accuracy important in an additives/catalyst application that requires precise dosing flow.

The filter proposed uses five filter cartridges each with 20 square meters media bag. This solution permits to do the filtering and the cleaning of the filter media bag at the same time as alternating the operative cycles of different cartridges.

The equipment can include the following:
1. One portable self-erecting storage silo, welded mild steel construction, having a usable capacity of 40 m$^3$. The self-erecting portable silo is complete with the following features:
   Trailer mounted silo
   Hydraulic erection power package
   2500 mm diameter
   6500 mm overall erect height (highest point of equipment)
   4" Truck fill line
   Vent filter dust collector with polyester cartridge filter media; the filter includes five cartridge filters
   Two level controls for high and low level indication
   Top perimeter guard rail with safety gate, access ladder and safety cable.

60° discharge cone

Exterior painted finish is enamel

The silo is trailer mounted and delivered to the work-site via semi-tractor. The trailer wheels and front support are retractable and in the retracted position, the trailer frame becomes the silo base. The included hydraulic package is used to raise the silo into the fill/discharge position. Flexible connections at the off-legs of the silo discharge system are connected to the inlet of each weigh transported after silo is in position.

Prior to lowering the silo into the trailering position, all of the sorbent material must be emptied from the silo.

2. One fluidizing system complete with:

Four pad fluidizers

One solenoid valve

One gate valve for air control flow

One pressure regulator with gauge

One kit of fittings and polytube for pneumatic connections.

3. One fluidizing bin bottom complete with three individual air injection valve assemblies, having ceramic seats and abrasion resistant clear urethane cone seals includes:

One single coil solenoid valve for aeration valve sequencing, with hoses and fittings.

One air operated butterfly valve.

4. One manual butterfly valve mild steel construction to be used for the maintenance operations 5. One flanged adapter 6. One butterfly valve, 7. One flanged adapter 8. One set of coupling, painted cast iron body, EPDM black gasket.

9. One set of Gravity flexible connector

10. One pre-assembled transporter unit. The pre-assembled transporter will provide a single assembly to place into service that will require minimal attachment to the material source, conveying line, high pressure air source, pilot air line, and field electrical wiring. The pre-assembled unit, as received, will have the valves, level control, aeration devices, air controls, and electrical controls all pre-piped and wired. After the unit is assembled the components will be cycled and tested and all air piping will be pressure tested. The assembly will provide a reliable, and ready to operate unit requiring minimal field labor, expediting installation, check out, start-up time, and expense. The pre-assembled transporter unit will consist of:

One transporter inlet butterfly valve, with rack and pinion double-acting air operator, solenoid valve and limit switches.

One flanged adapter

One transporter vent butterfly valve, with rack and pinion double-acting air operator.

One flanged adapter for venting.

One transporter complete with six externally accessible and replaceable aeration jets, an outlet fitting with coupling. Pressure vessel is of mild steel construction and includes support legs, a pressure relief valve, and a manway. The pressure vessel is designed and built according to PED code 97/23/CE European and has a National Board stamp and certification.

One system pressure controls and top air assembly with pressure switch, designed for single point control of air pressure to the transporter and air assist assemblies.

One level control, capacitance probe type, mounted in the transporter for high level indication to control the fill cycle.

11. One load cell kit, to include three load cells, stainless steel summing box, mounts, and cable.

12. Three dummy load cells to be installed for equipment shipping.

13. Two flexible hose, mild steel construction, inlet and outlet plain end.

14. One set of coupling, galvanized cast iron body, EPDM black gasket.

15. One electrical enclosure. The enclosure contains a PLC ALLEN BRADLEY or Siemens processor with required I/O modules to monitor and control system operation and ethernet card for communication with customer digital control system. Terminals within the enclosure permit wiring of the system to the PLC. The operator interface is an HMI 10" Panel Operator, which is mounted within the enclosure. A scale card module performs the weighing. The scale card is installed in the PLC chassis. The operator interface provides status of the system devices for the operator.

Example 2: Drop-Off Portable Addition or Injection System for Injecting Catalyst Additives The addition or injection system has been designed for the injection rate of 10 MT/day maximum of catalyst additives from a self-erecting portable loader. This second solution permits obtaining a static system. The truck can move the silo with the conveying system to the work-site and put it in function. The truck can move the silo full of product and the use of a permanent silo allow to have a continuous supply of the product according to the site condition with the following benefits:

the system can be placed in the operative condition with the minimal mechanical interfacing;

the transporter uses a dense pressure system that allows to reduce the air consumption but also allows conveying according to the process specifications;

the additive can be easily loaded to both in manual and auto mode according to the process or customer specifications;

with this low flow the addition or injection system offers a higher accuracy important in an additives application that require a precise dosing flow.

(1) to move the silo full of product via semi-tractor the use of a filter positioned on the base of the silo near the transporter can be considered;

(2) for the loading of the system the use of a venturi eductor to supply the unloading of bulk bags has been proposed.

The equipment includes the following:

1. One portable free standing storage silo, welded mild steel construction, having a usable capacity of 20 m$^3$. The silo is complete with the following features:

Trailer mounted silo.

Hydraulic erection power package.

Truck fill line with cam-lock connector and inline screener.

Two level controls for high and low level indication.

Top perimeter guard rail with safety gate, access ladder and safety cable.

Discharge cone.

Exterior painted finish is enamel. Interior is unpainted.

2. One eductor with manual ball valves and exhaust muffler, for the unloading of the product from bulk bags. Vacuum hose with adapter fittings and pick-up wand.

3. One fluidizing system complete with:
Four pad fluidizers
One solenoid valve
One gate valve for air control flow
One pressure regulator with gauge
One kit of fittings and polytube for pneumatic connections.
4. One fluidizing bin bottom, complete with three individual air injection valve assemblies, having ceramic seats and abrasion resistant clear urethane cone seals includes:
One single coil solenoid valve for aeration valve sequencing, with hoses and fittings.
One air operated butterfly valve.
5. One manual butterfly valve to be used for the maintenance operations
6. One flanged adapter.
7. One butterfly valve, double pneumatic actuator,
8. One flanged adapter.
9. One set of coupling, painted cast iron body, EPDM black gasket.
10. One (1) set of Gravity flexible connector with clamp connection.
11. One pre-assembled transporter unit. The pre-assembled transporter will provide a single assembly to place into service that will require minimal attachment to the material source, conveying line, high pressure air source, pilot air line, and field electrical wiring. The pre-assembled unit, as received, will have the valves, level control, aeration devices, air controls, and electrical controls all pre-piped and wired. After the unit is assembled the components will be cycled and tested and all air piping will be pressure tested. The assembly will provide a reliable, and ready to operate unit requiring minimal field labor, expediting installation, check out, start-up time, and expense. The pre-assembled transporter unit will consist of:
One transporter inlet butterfly valve with rack and pinion double-acting air operator, solenoid valve and limit switches.
One flanged adapter
One transporter vent butterfly valve, with rack and pinion double-acting air operator.
One flanged adapter for venting.
One transporter, complete with six externally accessible and replaceable aeration jets, an outlet fitting with coupling. Pressure vessel is of mild steel construction and includes support legs, a pressure relief valve, and a manway. The pressure vessel is designed and built according to PED code 97/23/CE European and has a National Board stamp and certification.
One system pressure controls and top air assembly with pressure switch, designed for single point control of air pressure to the transporter and air assist assemblies.
One level control, capacitance probe type, mounted in the transporter for high level indication to control the fill cycle.
12. One load cell kit, to include three load cells, stainless steel summing box, mounts, and cable.
13. Three dummy load cells to be installed for equipment shipping.
14. Two flexible hose, inlet and outlet plain end.
15. One set of coupling, galvanized cast iron body, EPDM black gasket.
16. One electrical enclosure. The enclosure contains a PLC ALLEN BRADLEY or Siemens processor with required I/O modules to monitor and control system operation and ethernet card for communication with customer digital control system Terminals within the enclosure permit wiring of the system to the PLC. The operator interface is an HMI 10" Panel Operator, which is mounted within the enclosure. A scale card module performs the weighing. The scale card is installed in the PLC chassis. The operator interface provides status of the system devices for the operator.

Although this invention has been described here in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method of installing a temporary addition or injection system at a work-site, the method comprising the steps of:
(i) mounting one or more silos on a trailer;
(ii) mounting one or more transfer pots and one or more control systems on the trailer;
(iii) transporting the one or more silos, the one or more transfer pots, and the one or more control systems on the trailer to the work-site; and
(iv)(a) self-erecting the one or more silos to stand vertically on the trailer at the work-site or (iv)(b) dismounting the one or more silos at the work-site;
(v) connecting the one or more silos to a unit or system at the work-site via the one or more transfer pots, wherein the one or more silos are (A) pre-filled with material before step (i) or (B) filled with material after step (i);
(vi) utilizing load cells for measuring the amount of material entering and leaving the one or more transfer pots which are positioned on the load cells;
(vii) homogenizing the material using an air or nitrogen ring installed on the one or more transfer pots or the one or more silos;
(viii) utilizing compressed gas to inject the material from the one or more transfer pots into a unit or system at the work-site.

2. The method of claim 1, wherein in step (ii) the one or more transfer pots and the one or more control systems are either
(a) directly or indirectly connected to the one or more silos mounted on the trailer or
(b) mounted adjacent to the one or more silos mounted on the trailer.

3. The method of claim 1, wherein (iv)(a) further comprises standing the self-erected one or more silos vertically and directly above the one or more transfer pots and the one or more control systems.

4. The method of claim 1, wherein the compressed gas is air, nitrogen, helium, neon, argon, krypton, xenon, radon, and mixtures thereof.

5. The method of claim 1, wherein the one or more transfer pots uniformly mixes the material.

6. The method of claim 1, wherein the material is solid, semi-solid, liquid, or gas.

7. The method of claim 6, wherein the material is a catalyst, a co-catalyst, an additive, or mixtures thereof.

8. The method of claim 1, wherein the unit or system at the work-site is a fluid catalytic cracking unit.

9. A method of injecting material from a temporary addition or injection system into a unit or system at a work-site, the method comprising the steps of:
- (i) transporting one or more silos, one or more transfer pots, and one or more control systems mounted on a trailer to the work-site;
- (ii)(a) self-erecting the one or more silos to stand vertically on the trailer at the work-site or (ii)(b) dismounting the one or more silos at the work-site;
- (iii) connecting the one or more silos to the unit or system at the work-site via the one or more transfer pots;
- (iv) homogenizing the material using an air or nitrogen ring installed on the one or more transfer pots or the one or more silos; and
- (v) utilizing compressed gas to inject the material from the one or more transfer pots into the unit or system at the work-site.

10. The method of claim 9 further comprising:
- (vi) utilizing load cells for measuring the amount of material entering and leaving the one or more transfer pots which are positioned on the load cells.

11. The method of claim 9, wherein the one or more silos are (A) pre-filled with material before step (i) or (B) filled with material after step (i).

* * * * *